Patented Sept. 22, 1936

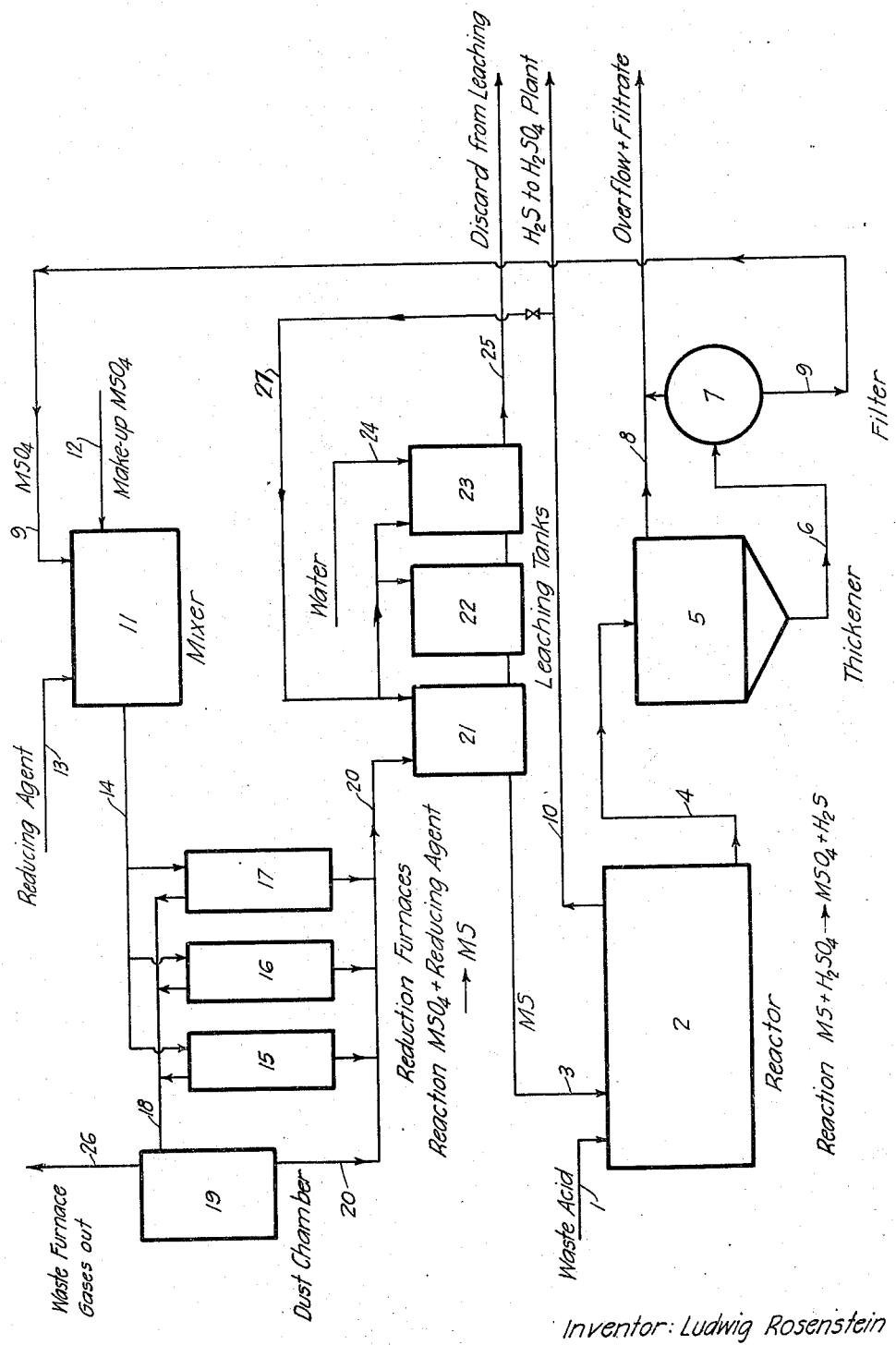

2,055,419

UNITED STATES PATENT OFFICE 2,055,419

RECOVERY OF SULPHURIC ACID

Ludwig Rosenstein, San Francisco, Calif., assignor to Shell Development Company, San Francisco, Calif., a corporation of Delaware Application October 14, 1935, Serial No. 44,875

14 Claims. (Cl. 23—173)

This invention relates to a process for the recovery of the sulphuric acid content of waste acid liquors which involves reduction of the sulphuric acid content of the treated acid liquor to hydrogen sulphide and subsequent oxidation of the hydrogen sulphide to fresh sulphuric acid. More particularly, the invention relates to the combination of steps in such a process which comprises contacting the waste acid liquor containing sulphuric acid with an aqueous solution or suspension of an alkaline earth metal sulphide at an elevated temperature at which the corresponding substantially insoluble metal sulphate is precipitated and hydrogen sulphide is evolved, separating the metal sulphate from the aqueous reaction mixture, reducing the metal sulphate to the corresponding metal sulphide and reutilizing the metal sulphide in the first step of the process.

The principles of my cyclic sulphuric acid recovery process are broadly applicable to the recovery of sulphuric acid from waste acid liquors obtained in the execution of a wide variety of chemical and metallurgical processes. It provides a practical and economical method for recovering the sulphuric acid content of acid sludges and other waste acid liquors from petroleum refining and treating operations, for recovering the sulphuric acid from acid liquors produced from roaster gases in metallurgical processes, from acid liquors obtained in the treatment of ores with sulphuric acid, from waste acid liquors obtained in metal pickling operations, from acid liquors obtained in the manufacture of alcohols, ethers, olefine polymers, etc. by the conventional olefine absorption methods, and the like.

My invention is particularly well adapted to the treatment of aqueous acid solutions containing sulphuric acid in a concentration of about 20%, although aqueous acid liquors containing higher or lower sulphuric acid concentrations may be advantageously treated. When concentrated acid liquors as acid sludges are treated, they are preferably diluted to an acid concentration of about 20% or lower by the addition of water thereto prior to, during or after their introduction into the primary reaction stage. Aqueous acid liquors obtained in the production of alcohols by olefine absorption methods usually contain from about 15% to about 40% sulphuric acid. Such aqueous acid liquors may be treated per se, or when they contain more than about 20% sulphuric acid they may be diluted as desired.

The known sulphuric acid recovery processes when applied to dilute aqueous acid solutions usually comprise concentration of the acid liquor by removal of a part of the water therefrom. The cost of such concentration treatments is usually prohibitive and consequently the common practice has been to discharge the aqueous acid liquors as waste into any convenient stream or body of water. In addition to the considerable losses of sulphuric acid entailed, this procedure has met with the opposition of public authorities charged with the prevention of stream pollution, since free sulphuric acid is detrimental to vegetable and fish life. Where the discharge of the acid liquors has been prohibited, it has been necessary to install expensive neutralization processes which produce no by-product of sufficient value to cover production costs.

Aside from its nuisance elimination value, my process provides a practical and economical process for the substantially complete recovery of sulphuric acid from acid liquors diluted or contaminated to the extent that they have no commercial value. Relatively dilute aqueous acid liquors can be treated directly without first subjecting them to a costly concentration treatment. The sulphuric acid content of the acid liquor is reduced to hydrogen sulphide by employing the metal sulphide-metal sulphate cycle herein described, and the hydrogen sulphide is oxidized by a series of well known steps to fresh sulphuric acid suitable for any purpose desired.

The process is preferably executed by contacting the heated aqueous acid liquor with an aqueous solution or suspension of a barium, calcium or strontium monosulphide. The reaction whereby the metal sulphide and any metal sulphhydrate which may be present reacts with the sulphuric acid to form the substantially insoluble metal sulphate and hydrogen sulphide is conducted at about the boiling temperature of the reaction mixture at which temperature the reaction proceeds rapidly and hydrogen sulphide is driven from the reaction mixture substantially as soon as it is formed therein. The reaction is exothermic and, unless the mixture is too dilute, the heat of reaction is sufficient to maintain the reaction mixture at about the boiling temperature. The relative amounts of the reactants in the reaction chamber may be so proportioned that the reaction is substantially complete and the spent liquor discharged therefrom contains substantially no free sulphuric acid or dissolved metal sulphide. The reaction may be effected in the conventional type reaction vessels or chambers for effecting reactions of this type. The reaction vessel or vessels may be equipped with suitable heating means and means for agitating the contents.

The metal sulphide to be used in starting the process may be obtained from any convenient source. If desired, a sufficient amount of the metal sulphide may be initially prepared by reducing the corresponding metal sulphate in accordance with the metal sulphate reduction step of the process. After the cyclic process is in operation metal sulphate in the required amount may be added to the system from time to time to make up for losses. Due to the low initial cost and availability of barium and calcium sulphates, either of these salts is preferably used in the execution of the invention. Barium sulphate is available as the mineral baryte, and calcium sulphate is available commercially as gypsum. Generally, the best results are obtained when the cycle of the process involves barium sulphide and barium sulphate.

When the process is executed with barium sulphide, an aqueous solution of the barium sulphide, preferably about a 10% solution, may be added directly in the required amount to the heated acid liquor or the solid salt or a suspension thereof may be added. Calcium sulphide, since it is less soluble in water than barium sulphide, is preferably added to the reaction mixture as a suspension in water. If it is desired to add the calcium sulphide in a solution of sufficient concentration, the calcium sulphide can be brought into solution as calcium sulphhydrate by adding hydrogen sulphide to the suspension prior to its introduction into the reaction vessel. The alkaline earth metal sulphhydrates react with sulphuric acid in the same manner as the monosulphides, evolving hydrogen sulphide and precipitating the metal sulphate. It is seen that the use of the alkaline earth metal sulphhydrates is within the scope of the invention.

The metal sulphate precipitated in the acid liquor reactor may be discharged from the reaction vessel continuously or intermittently as a suspension in the spent aqueous reaction mixture. The solid sulphate may be separated from the suspension by conventional means. Standard equipment as Dorr thickeners, Oliver filters, and the like may be employed. The filtrate as well as any overflow of the liquid from the thickeners or settling tanks may be reutilized in whole or in part as solvent or carrier for the metal sulphide formed in the metal sulphate reduction stage, or it may be discharged from the system as desired. When the treated acid liquor contains sulphonic acids or sulphonates, the barium or calcium sulphonates are not precipitated but are soluble and may be discharged from the system in solution in the aqueous liquor. In the case of the calcium sulphonates, they are harmless and the spent liquor containing them may be discharged into streams or bodies of water without creating a nuisance. The barium salts are, however, poisonous and the waste liquid should be substantially free of barium ions. Therefore when sulphonates are present and barium salts are used in the process, the waste liquid from the filters and settlers may be treated and rendered harmless by adding a sufficient amount of sulphuric acid thereto to remove the barium ions as barium sulphate, the sulphonic acids coming out as an oily layer. When sulphonic acids and/or sulphonates are not present in the treated acid liquors and the reaction is effected at a sufficiently high temperature with the barium sulphide present in an amount equivalent to the sulphuric acid, the waste liquid from the reactor is substantially devoid of barium ions and/or hydrogen sulphide.

The solid metal sulphate separated in the filter stage may be dried by suitable means, for example, by contacting it with the hot exhaust gases from the reduction furnace or furnaces, and mixed with a suitable reducing agent or introduced together with a suitable reducing agent into a furnace or furnaces wherein it is reduced to the corresponding metal sulphide.

The reduction of the metal sulfates to the corresponding metal sulphides is readily effected with carbonaceous reducing agents at elevated temperatures in accordance with the well known reaction $MSO_4 + 4C \rightarrow MS + CO$. In the presence of hydrogen per se or hydrogen formed during the reaction, the reduction usually results in the formation of the metal sulphide, carbon dioxide and water. Reducing agents which may be conveniently and economically used are gaseous, liquid or solid carbonaceous materials as natural gas, water gas, producer gas, refinery gases, the hydrocarbons per se, oils, coke, tar, pitches, coal and other sources of carbon. The reduction reaction is in general exothermic but high temperatures of from about 700° C. to about 1200° C. are usually required for rapid reaction.

The reduction reaction may be conducted in different forms of apparatus. The apparatus usually comprises a combustion chamber of the conventional type such as a cement kiln or vertical shaft type reduction furnace or a battery of such furnaces, and means for separating the metal sulphide from the gas in or passing from the combustion chamber or chambers. The reduction furnace or furnaces may be externally heated by any suitable means. A suitable heat exchange apparatus may be interposed between the means for separating the metal sulphide from the gases and the combustion chamber. The metal sulphide may be separated from the gases by any suitable methods as by passing said gases through electrostatic precipitators, cyclone dust separators, bag filters, or by contacting them with a scrubbing liquid as water. If desired, the hot exhaust gases from the reduction furnace may be used to heat the acid liquor reaction vessel. If the discharged gases contain appreciable amounts of combustible materials as carbon monoxide and the like, they may be burned and the heat utilized as desired.

The metal sulphide formed in the reduction step of the process, along with carbon and other products of the reaction, may be conducted to leaching tanks in which the metal sulphide is leached out with water and the resulting solution or suspension thereof introduced into the acid liquor reactor wherein the sulphuric acid is reduced to hydrogen sulphide and the metal sulphate precipitated. It is seen that a cyclic process is provided which comprises a primary reaction stage wherein the metal sulphide reacts with the sulphuric acid content of the acid liquor to evolve hydrogen sulphide and precipitate the metal sulphate and a reduction stage wherein the metal sulphate is reduced to the metal sulphide, and reutilization of the metal sulphide the first step of the process.

The hydrogen sulphide discharged from the primary reaction stage may be used for any desired purpose; however, it is generally utilized for the production of sulphur or fresh strong sulphuric acid. The hydrogen sulphide may be oxidized to sulphuric acid by any of the well known methods. For example, the hydrogen sulphide may be reacted with a suitable amount of oxygen and oxidized to sulphur dioxide which can be used in the usual manner for sulphuric acid production. The sulphur dioxide can be converted to concentrated sulphuric acid in the usual type of contact plant employing a catalyst as platinum, vanadium and the like.

The process is described with reference to the accompanying drawing which is a diagrammatic flow sheet illustrating a suitable arrangement of reaction units for carrying out the cyclic process of the invention. It is to be understood that the successful execution of the invention is not limited to the arrangements illustrated since many others may be suitable.

Referring to the drawing, reference figure 1 indicates a conduit by means of which the waste acid liquor to be treated is introduced, continuously or intermittently, in the required amount, into the primary reaction stage 2 wherein it is reacted with a suitable amount of a suitable metal sulphide introduced therein as an aqueous solution or suspension through conduit 3. The reactor 2 may be a single reaction vessel or it may comprise a plurality of suitable reaction vessels in communication with each other, and inlet conduit 3 and outlet conduit 4, if desired. The reactor 2 may be equipped with suitable heating means as fuel burners, steam coils and the like for maintaining the reaction mixture therein at about its boiling temperature when the heat of reaction is insufficient. The solution or suspension of the metal sulphide introduced into reactor 2 by conduit 3 is formed in leaching tanks 21, 22 and 23. The introduced metal sulphide reacts with the sulphuric acid in aqueous solution in the reactor 2 whereby hydrogen sulphide is evolved and the corresponding substantially insoluble metal sulphate is precipitated. The evolved hydrogen sulphide together with some steam and other volatile substances which may be present is conducted by means of conduit 10 from the reactor stage 2 to the sulphuric acid plant wherein it is oxidized to fresh sulphuric acid by conventional means.

The suspension of the metal sulphate formed in reactor 2 is conducted by means of conduit 4, intermittently or continuously from reactor 2 to a suitable thickener 5. The thickened metal sulphate is conducted by means of conduit 6 to a suitable filter 7 or series of filters wherein the solid metal sulphate is separated and conducted by means of conduit 9 to mixer 11. The filtrate from the metal sulphate suspension as well as the overflow from the thickener or settler flows into conduit 8 and may be discharged from the system or, if desired, reutilized in leaching tanks 21, 22 and 23. Prior to its introduction into mixer 11, the metal sulphate may be dried by any suitable means. In mixer 11, the metal sulphate is mixed with the desired amount of a reducing agent, preferably a carbonaceous material, which is introduced therein by means of conduit 13. The mixture of the reducing agent and the metal sulphate is introduced by suitable means into reduction furnaces 15, 16 and 17 through conduit 14. When a gaseous reducing agent as natural gas, producer gas, and the like is used, mixer 11 may be dispensed with and the gaseous material and the dry metal sulphate charged, together or individually, directly into one or a plurality of reduction furnaces. Although a plurality of separate reduction furnaces are indicated on the drawing, it is to be understood that one or a plurality of suitable furnaces may be used and that they may be charged and heated in any suitable or convenient manner as desired. Conventional types of furnaces are suitable. The reduction furnaces are operated at elevated temperatures whereby the metal sulphate introduced therein is rapidly and substantially completely reduced to the corresponding metal monosulphide. The formed metal sulphide along with carbon, slag, etc. formed during the reduction is conducted by means of conduit 20 to leaching tanks 21, 22 and 23. The gases formed in the reduction furnace or furnaces are conducted through conduit 18 into dust chamber 19 or another suitable apparatus for separating the finely divided metal sulphide from the waste furnace gases. If desired, a suitable heat exchanger may be interposed between the reduction furnace or furnaces and the dust chamber. The metal sulphide and other solids, as carbon, separated from the furnace gases in dust chamber 19 are conducted by means of conduit 20 to leaching tanks 21, 22 and 23. The waste furnace gases may be discharged from the system through conduit 26. The waste furnace gases, if they contain combustible materials in sufficient amount may be used as fuel to supply part of the heat to the reduction furnaces or to heat the waste acid reactor or reactors.

A plurality of leaching tanks 21, 22 and 23 are represented on the drawing; however, it is to be understood that one or a plurality of such suitable tanks wherein the metal sulphide is leached from the carbon and other materials may be used. The metal sulphide is leached from the materials discharged from the reduction furnaces with water introduced into leaching tanks 21, 22 and 23, in the required amount, through conduit 24. The material from which the metal sulphide has been leached out may be discharged from the system through conduit 25. If desired, a part of the hydrogen sulphide discharged from the reactor 2 may be introduced by means of conduit 27 into the leaching tanks to aid in bringing the metal sulphide into solution as the metal sulphhydrate. The metal sulphide solution or suspension formed in the leaching tanks 21, 22 and 23, is conducted by means of conduit 3 into the primary reactor, thus completing the cycle.

Suitable valves, pumps, heat-exchangers, conveyors and the like may be interposed in the cycle at any desired point.

While I have described my invention in a detailed manner and described suitable means of executing the same, it is to be understood that modifications may be made and that no limitations other than those imposed by the scope of the appended claims are intended.

I claim as my invention:

1. In a process for the recovery of the sulphuric acid content of aqueous acid liquors wherein the sulphuric acid is reduced to hydrogen sulphide and the hydrogen sulphide oxidized to fresh sulphuric acid, the steps which comprise reacting the acid liquor with a sulphide of the formula MS wherein M represents Ca, Ba or Sr to form a substantially insoluble metal sulphate and evolve hydrogen sulphide, separating the metal sulphate from the aqueous reaction mixture, reducing the metal sulphate to the corresponding metal sulphide, and reutilizing the metal sulphide in the first step of the process.

2. In a process for the recovery of the sulphuric acid content of aqueous acid liquors wherein the sulphuric acid is reduced to hydrogen sulphide and the hydrogen sulphide converted to fresh sulphuric acid, the steps which comprise reacting the acid liquor with calcium sulphide to form calcium sulphate and evolve hydrogen sulphide, separating the calcium sulphate from the aqueous reaction mixture, reducing the calcium sulphate to calcium sulphide, and reutilizing the calcium sulphide in the first step of the process.

3. In a process for the recovery of the sulphuric acid content of aqueous acid liquors wherein the sulphuric acid is reduced to hydrogen sulphide and the hydrogen sulphide converted to fresh sulphuric acid, the steps which comprise reacting the acid liquor with barium sulphide to form barium sulphate and evolve hydrogen sulphide, separating the barium sulphate from the aqueous reaction mixture, reducing the barium sulphate to barium sulphide, and reutilizing the barium sulphide in the first step of the process.

4. In a process for the recovery of the sulphuric acid content of aqueous acid liquors wherein the sulphuric acid is reduced to hydrogen sulphide and the hydrogen sulphide converted to fresh sulphuric acid, the steps which comprise contacting the acid liquor with an aqueous solution of barium sulphide at a temperature at which barium sulphate is precipitated and hydrogen sulphide is evolved, separating the barium sulphate from the aqueous reaction mixture, reducing the barium sulphate to barium sulphide by treatment with a reducing agent at an elevated temperature, and reutilizing the barium sulphide in the first step of the process.

5. In a process for the recovery of the sulphuric acid content of aqueous acid liquors wherein the sulphuric acid is reduced to hydrogen sulphide and the hydrogen sulphide converted to fresh sulphuric acid, the steps which comprise contacting the acid liquor with an aqueous suspension of calcium sulphide at a temperature at which calcium sulphate is precipitated and hydrogen sulphide is evolved, separating the calcium sulphate from the aqueous reaction mixture, reducing the calcium sulphate to calcium sulphide by treatment with a reducing agent at an elevated temperature, and reutilizing the calcium sulphide in the first step of the process.

6. In a process for the recovery of the sulphuric acid content of aqueous acid liquors wherein the sulphuric acid is reduced to hydrogen sulphide and the hydrogen sulphide converted to fresh sulphuric acid, the steps which comprise contacting an aqueous acid liquor having a sulphuric acid concentration of about 20% with a sulphide of the formula MS wherein M represents Ca, Ba or Sr at an elevated temperature to form the corresponding substantially insoluble metal sulphate and evolve hydrogen sulphide, separating the metal sulphate from the aqueous reaction mixture, reducing the metal sulphate to the corresponding metal sulphide, and reutilizing the metal sulphide in the first step of the process.

7. In a process for the recovery of the sulphuric acid content of aqueous acid liquors wherein the sulphuric acid is reduced to hydrogen sulphide and the hydrogen sulphide converted to fresh sulphuric acid, the steps which comprise contacting an aqueous acid liquor having a sulphuric acid concentration of about 20% with about a stoichiometrical amount of an aqueous barium sulphide solution having a concentration of about 10% at about the boiling temperature of the reaction mixture whereby barium sulphate is precipitated and hydrogen sulphide evolved, separating the barium sulphate from the aqueous reaction mixture, reducing the barium sulphate to barium sulphide by reacting it with a carbonaceous reducing agent at an elevated temperature at which the reduction occurs at a practical rate, redissolving the barium sulphide in sufficient water to form about a 10% solution, and contacting the barium sulphide solution with the acid liquor in the first stage of the process.

8. In a process for the recovery of the sulphuric acid content of aqueous acid liquors wherein the sulphuric acid is reduced to hydrogen sulphide and the hydrogen sulphide converted to fresh sulphuric acid, the steps which comprise contacting the acid liquor with an aqueous solution of barium sulphide at about the boiling temperature of the reaction mixture whereby barium sulphate is precipitated and hydrogen sulphide is evolved, separating the barium sulphate from the aqueous reaction mixture, reducing the barium sulphate to barium sulphide by heating it at an elevated temperature in a reducing atmosphere with carbonaceous matter, leaching the cinder with water to obtain an aqueous solution of barium sulphide, and reutilizing the barium sulphide solution in the first step of the process.

9. In a process for the recovery of the sulphuric acid content of aqueous acid liquors wherein the sulphuric acid is reduced to hydrogen sulphide and the hydrogen sulphide converted to fresh sulphuric acid, the steps which comprise contacting the acid liquor with an aqueous solution containing calcium sulphide and calcium sulphydrate at an elevated temperature to precipitate calcium sulphate and evolve hydrogen sulphide, separating the calcium sulphate from the aqueous reaction mixture, reducing the calcium sulphate to calcium sulphide by treatment with a reducing agent at an elevated temperature, treating the resulting calcium sulphide with water in the presence of hydrogen sulphide, and utilizing the resulting solution containing calcium sulphide and calcium sulphhydrate in the first step of the process.

10. In a process for the recovery of the sulphuric acid content of waste acid liquors wherein the sulphuric acid is reduced to hydrogen sulphide and the hydrogen sulphide oxidized to useful materials, the steps which comprise reacting the acid liquor with a sulphide of the formula MS, wherein M represents Ca, Ba or Sr, in the presence of a substantial amount of water at an elevated temperature to form a substantially insoluble metal sulphate and evolve hydrogen sulphide, separating the metal sulphate from the aqueous reaction mixture, reducing the metal sulphate to the corresponding metal sulphide, and reutilizing the metal sulphide in the first step of the process.

11. In a process for the recovery of the sulphuric acid content of waste acid liquors wherein the sulphuric acid is reduced to hydrogen sulphide and the hydrogen sulphide oxidized to useful materials, the steps which comprise reacting the acid liquor with an aqueous solution of barium sulphide at about the boiling temperature of the aqueous reaction mixture to form barium sulphate and evolve hydrogen sulphide, separating the barium sulphate from the aqueous reaction mixture, reducing the barium sulphate to barium sulphide, and reutilizing the barium sulphide in the first step of the process.

12. In a process for the recovery of the sulphuric acid content of waste acid liquors wherein the sulphuric acid is reduced to hydrogen sulphide and the hydrogen sulphide oxidized to sulphur, the steps which comprise reacting the acid liquor with a sulphide of the formula MS, wherein M represents Ca, Ba or Sr, in the presence of a substantial amount of water at about the boiling temperature of the reaction mixture to form a substantially insoluble metal sulphate and evolve hydrogen sulphide, separating the metal sulphate from the aqueous reaction mixture, reducing the metal sulphate to the corresponding metal sulphide, and reutilizing the metal sulphide in the first step of the process.

13. In a process for the recovery of the sulphuric acid content of waste acid liquors wherein the sulphuric acid is reduced to hydrogen sulphide and the hydrogen sulphide oxidized to sulphur, the steps which comprise reacting the acid liquor with an aqueous solution of barium sulphide at about the boiling temperature of the reaction mixture to precipitate barium sulphate and evolve hydrogen sulphide, separating the barium sulphate from the aqueous reaction mixture, reducing the barium sulphate to barium sulphide, and reutilizing the barium sulphide in the first step of the process.

14. In a process for the recovery of the sulphuric acid content of aqueous acid liquors wherein the sulphuric acid is reduced to hydrogen sulphide and the hydrogen sulphide converted to fresh sulphuric acid, the steps which comprise contacting the acid liquor with an aqueous solution containing barium sulphide and barium sulphhydrate at an elevated temperature to precipitate barium sulphate and evolve hydrogen sulphide, separating the barium sulphate from the aqueous reaction mixture, reducing the barium sulphate to barium sulphide by treatment with a reducing agent at an elevated temperature, treating the resulting barium sulphide with water in the presence of hydrogen sulphide, and utilizing the resulting solution containing barium sulphide and barium sulphhydrate in the first step of the process.

LUDWIG ROSENSTEIN.